US011506298B2

(12) United States Patent
Wu et al.

(10) Patent No.: US 11,506,298 B2
(45) Date of Patent: Nov. 22, 2022

(54) CHARGING VALVE, AIR CONDITIONING SYSTEM AND ELECTRIC VEHICLE

(71) Applicant: Gree Electric Appliances, Inc. of Zhuhai, Zhuhai (CN)

(72) Inventors: Huili Wu, Zhuhai (CN); Zhaoyu Li, Zhuhai (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 18 days.

(21) Appl. No.: 17/052,395

(22) PCT Filed: Jan. 29, 2019

(86) PCT No.: PCT/CN2019/073710
§ 371 (c)(1),
(2) Date: Nov. 2, 2020

(87) PCT Pub. No.: WO2020/015350
PCT Pub. Date: Jan. 23, 2020

(65) Prior Publication Data
US 2021/0231226 A1 Jul. 29, 2021

(30) Foreign Application Priority Data
Jul. 17, 2018 (CN) .......................... 201810786151.2

(51) Int. Cl.
*F16K 27/02* (2006.01)
*F16K 41/02* (2006.01)
(Continued)

(52) U.S. Cl.
CPC .............. *F16K 27/02* (2013.01); *F16K 41/02* (2013.01); *F16K 27/08* (2013.01); *F16K 27/12* (2013.01)

(58) Field of Classification Search
CPC .................................................. F25B 2345/006
See application file for complete search history.

(56) References Cited

U.S. PATENT DOCUMENTS 2,549,075 A * 4/1951 Fox ....................... B60C 29/007
137/223
5,139,049 A * 8/1992 Jensen ..................... F16L 37/34
137/614.05
(Continued)

FOREIGN PATENT DOCUMENTS

CN 201212561 Y 3/2009
CN 202360970 U 8/2012
(Continued)

OTHER PUBLICATIONS

International Search Report for corresponding PCT/CN2019/073710, dated Apr. 26, 2019, 3 pages.

*Primary Examiner* — Robert K Arundale
(74) *Attorney, Agent, or Firm* — Armstrong Teasdale LLP

(57) ABSTRACT

The disclosure discloses a charging valve, an air conditioning system and an electric vehicle. The charging valve includes: an outer valve body including a first inner cavity, the outer valve body is provided with a connection port in communication with the first inner cavity; an inner valve body movably installed in the first inner cavity, the inner valve body has a sealing position for closing the connection port and a charging position for opening the connection port, and the inner valve body is provided with a second inner cavity; and a valve core assembly, installed in the second inner cavity. The inner valve body of such a charging valve realizes the isolation of the valve core assembly from the connection port. A problem that air enters the air conditioning system in a vacuum state or that leakage appears in the valve core assembly is avoided.

16 Claims, 4 Drawing Sheets

(51) Int. Cl.
*F16K 27/08* (2006.01)
*F16K 27/12* (2006.01)

(56) References Cited

U.S. PATENT DOCUMENTS

| | | | | |
|---|---|---|---|---|
| 5,653,256 | A * | 8/1997 | Myers | F16K 27/0209 |
| | | | | 137/454.2 |
| 6,269,840 | B1 * | 8/2001 | Beaver | F16K 15/18 |
| | | | | 137/637.4 |
| 6,273,397 | B1 * | 8/2001 | Schultz | F25B 41/40 |
| | | | | 251/149.6 |
| 6,354,100 | B1 | 3/2002 | Spanos et al. | |
| 6,637,726 | B1 * | 10/2003 | Yamamoto | F16K 1/46 |
| | | | | 251/152 |
| 7,114,344 | B2 * | 10/2006 | Gilbert | B60H 1/00485 |
| | | | | 62/292 |
| 9,969,242 | B2 * | 5/2018 | Kesler | B60H 1/00585 |
| 2003/0116199 | A1 * | 6/2003 | Schroeder | F16K 15/063 |
| | | | | 137/541 |
| 2014/0352789 | A1 * | 12/2014 | Gov | F16K 27/02 |
| | | | | 137/1 |

FOREIGN PATENT DOCUMENTS

| | | | |
|---|---|---|---|
| CN | 104154246 | A | 11/2014 |
| CN | 204878864 | U | 12/2015 |
| CN | 205956420 | U | 2/2017 |
| CN | 108612896 | A | 10/2018 |
| JP | 2012017803 | A | 1/2012 |

* cited by examiner

CHARGING VALVE, AIR CONDITIONING SYSTEM AND ELECTRIC VEHICLE

RELATED APPLICATION

The present disclosure is a national stage application of International Patent Application No. PCT/CN2019/073710, filed Jan. 29, 2019, which claims priority to Chinese patent application No. 201810786151.2, filed on Jul. 17, 2018 and entitled "Charging Valve, Air Conditioning System and Electric Vehicle", the disclosure of which are hereby incorporated by reference in their entirety.

TECHNICAL FIELD

The disclosure relates to the technical field of control valves, and in particular to a charging valve, an air conditioning system and an electric vehicle.

BACKGROUND

Along with the development of electric vehicles, heat pump automobile air conditioners are rapidly developed, the choice of refrigerants for a new-type heat pump automobile air conditioner is not just limited to a R134a refrigerant, applications of R410A and $CO_2$ in the automobile air conditioners are also competitively researched by each major supplier, operating pressures of R410A and $CO_2$ air conditioning systems are higher than that of the R134a refrigerant, higher requirement are required to pressure resistance and reliability of various elements in a system, and it is urgent to develop an element suitable for a high operating pressure.

However, when the automobile air conditioning system adopts a refrigerant of which an operating pressure is higher than that of the R134a system, a pressure resistance value of a fluorine charging nozzle of the original R134a system is not enough, and a leakage amount of the refrigerant exceeds a standard requirement. In addition, there are multiple fluorine charging nozzles in the automobile air conditioning system, but when only one of them is used for vacuumizing, leakage is caused by the unused fluorine charging nozzles due to an insufficient spring force, and incomplete vacuumization is caused.

SUMMARY

Some embodiments of the disclosure is to provide a charging valve, an air conditioning system and an electric vehicle, as to solve a problem in an existing technology that leakage easily happens to a fluorine charging nozzle of an automobile air conditioning system.

In some embodiments of the disclosure, a charging valve is provided, including: an outer valve body, the outer valve body includes a first inner cavity, the outer valve body is provided with a connection port in communication with the first inner cavity; an inner valve body, the inner valve body is movably installed in the first inner cavity, the inner valve body has a sealing position for closing the connection port and a charging position for opening the connection port, and the inner valve body is provided with a second inner cavity; and a valve core assembly, the valve core assembly is installed in the second inner cavity.

In some embodiments, at least two sealing structures are configured in a gap between the inner valve body and the outer valve body.

In some embodiments, a first end face of the outer valve body is provided with an installing hole in communication with the first inner cavity, a side wall of a second end, opposite to a first end, of the outer valve body is provided with the connection port, the inner valve body is installed in the first inner cavity from the installing hole and reciprocated along a direction from the first end of the outer valve body to the second end so as to switch between the sealing position and the charging position.

In some embodiments, an inner wall of the installing hole is provided with a stop structure.

In some embodiments, the stop structure is a stop ring or multiple stop bulges configured along the same circumferential direction of the installing hole.

In some embodiments, an inner wall of the first inner cavity is provided with a first internal thread, the first internal thread is positioned between the installing hole and the connection port; a periphery of the inner valve body is provided with a first external thread, the outer valve body and the inner valve body are cooperatively connected through the first internal thread and the first external thread.

In some embodiments, each of two ends of the first external thread is provided with at least one first sealing ring.

In some embodiments, one end of the outer valve body is provided with a first prism section.

In some embodiments, a first end, close to the installing hole, of the inner valve body is provided with a second prism section.

In some embodiments, the periphery of the inner valve body is provided with a connection portion, the connection portion is farther away from the connection port than the second prism section.

In some embodiments, the connection portion is a lug boss, and there is a groove between the lug boss and the second prism section.

In some embodiments, the second inner cavity passes through the inner valve body along a length direction of the inner valve body, and a first end of the inner valve body is detachably provided with a valve cover.

In some embodiments, the first end of the inner valve body is provided with a thread section, the valve cover is provided with a thread hole cooperatively connected with the thread section, and a bottom of the thread hole is provided with a first sealing gasket.

In some embodiments, the valve core assembly includes a valve core and a valve rod mechanism, the valve core is installed in the second inner cavity, the valve core is provided with a charging channel, the valve rod mechanism is installed in the charging channel so as to open or close the charging channel, when the inner valve body is positioned in the charging position and the charging channel is opened by the valve rod mechanism, the charging channel is communicated with the connection port.

In some embodiments, an exterior of the valve core is provided with a second external thread, a second internal thread is configured in the second inner cavity, the valve core and the inner valve body are cooperatively connected through the second external thread and the second internal thread.

In some embodiments, a second sealing ring is configured between the valve core and the second inner cavity, and the second sealing ring is positioned at a first end or a second end of the second external thread; or two second sealing rings are respectively positioned at the first end and the second end of the second external thread.

In some embodiments, the charging channel passes through the valve core along a length direction of the inner valve body, the valve rod mechanism includes: a valve rod and an elastic element, the valve rod is installed in the charging channel, a first end of the valve rod is protruded from the valve core, and a first end of the valve rod is provided with an outer flange, the elastic element is sheathed on the valve rod, and two ends of the elastic element are respectively pressed against the outer flange and the valve core; a second end of the valve rod is provided with a blocking head and a second sealing gasket, when a pressing force is applied to the first end of the valve rod in a direction from the first end to the second end, the blocking head is moved towards a direction away from the charging channel, and the charging channel is opened by the blocking head; and when an external force is not applied to the valve rod, the blocking head is pressed close to the valve core under the effect of the elastic element, a gap between the charging channel and the blocking head is sealed by the second sealing gasket, and the charging channel is closed.

In some embodiments of the disclosure, an air conditioning system is provided, including a charging valve, the charging valve is the above charging valve.

In some embodiments of the disclosure, an electric vehicle is provided. The electric vehicle including an air conditioning system, the air conditioning system is the above air conditioning system.

A technical scheme of the disclosure is applied, because the valve body of the charging valve in the disclosure includes the outer valve body and the inner valve body, the inner valve body is a structure which is moveably installed in the first inner cavity in the outer valve body, in actual use, the inner valve body has the sealing position for closing the connection port on the outer valve body and the charging position for opening the connection port. When the charging valve in the disclosure is used in the air conditioning system, through the effect of the inner valve body, the isolation of the valve core assembly and the connection port is achieved, when the air conditioning system is vacuumized, an unused charging valve does not cause former incomplete vacuumization due to an insufficient spring force on the valve core assembly; and at the same time, through a cut-off function that the connection port is closed by the inner valve body, a problem that air enters the air conditioning system in a vacuum state or that leakage appears in the valve core assembly is avoided.

BRIEF DESCRIPTION OF THE DRAWINGS

The accompanying drawings, which constitute a part of the disclosure, are used to provide a further understanding of the disclosure, and the embodiments of the disclosure and the description thereof are used to explain the disclosure, but do not constitute improper limitations to the disclosure. In the drawings.

DRAWING REFERENCE SIGNS

Figure 1:
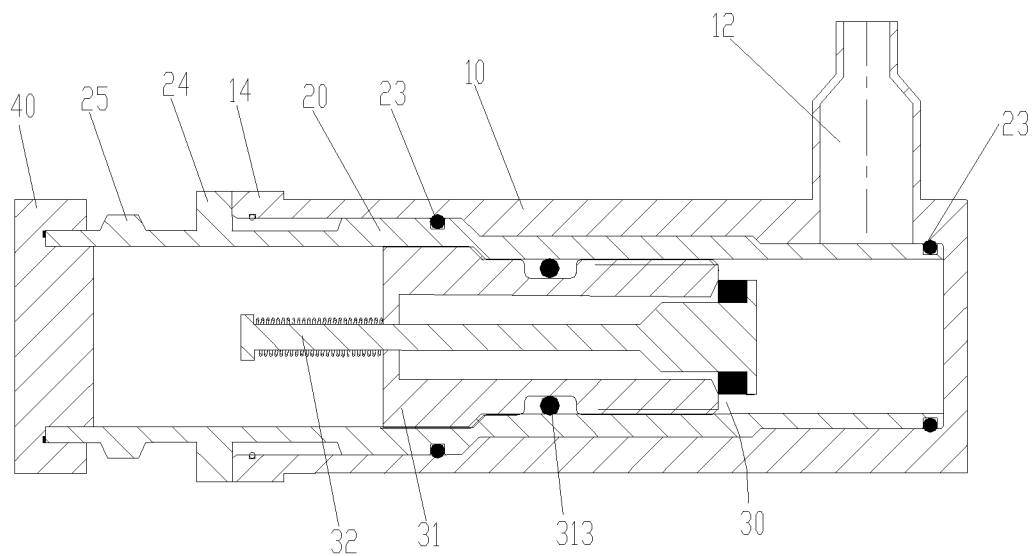
FIG. 1 schematically shows a sectional view of a charging valve of the disclosure.
Figure 2:
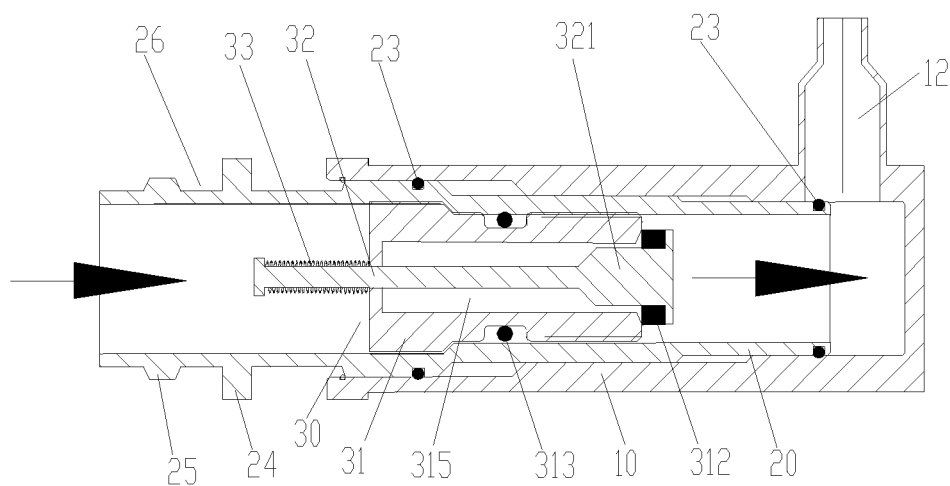
FIG. 2 schematically shows a sectional view of the charging valve of the disclosure during charging.
Figure 3:
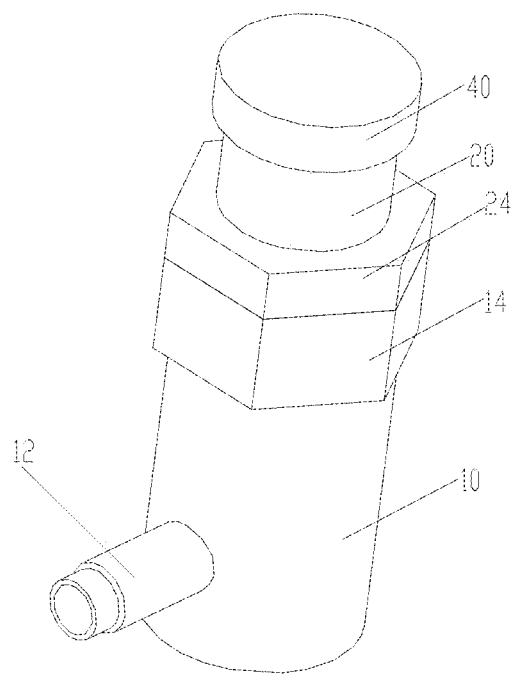
FIG. 3 schematically shows a stereogram of the charging valve of the disclosure.
Figure 4:
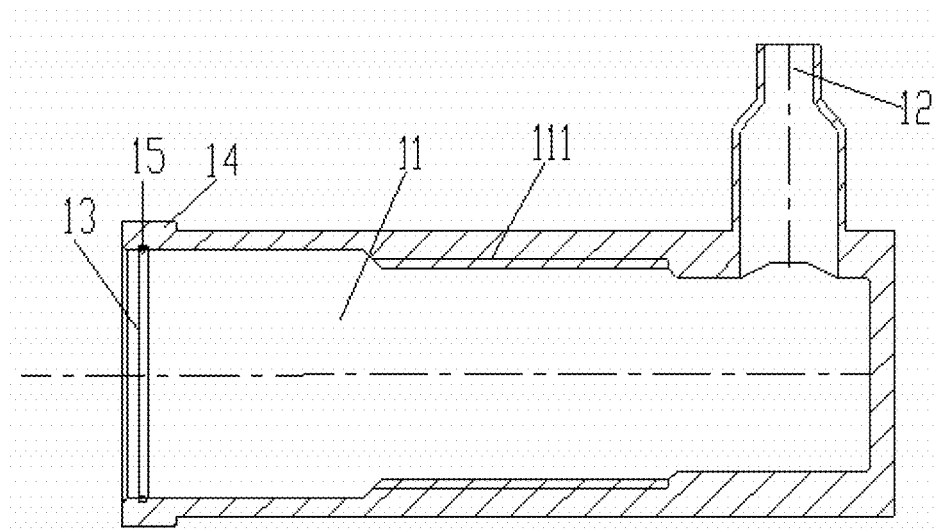
FIG. 4 schematically shows a sectional view of an outer valve body of the disclosure.
Figure 5:
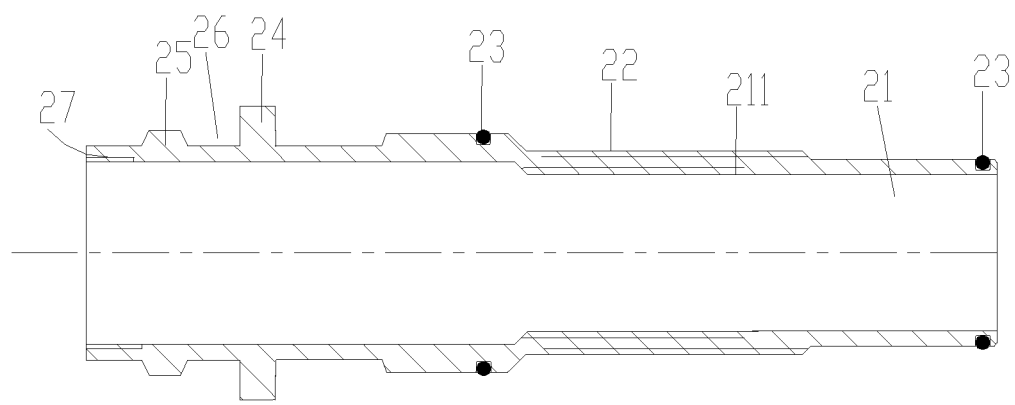
FIG. 5 schematically shows a sectional view of an inner valve body of the disclosure.
Figure 6:
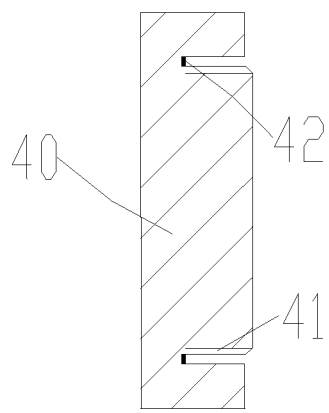
FIG. 6 schematically shows a sectional view of a valve cover of the disclosure.
Figure 7:
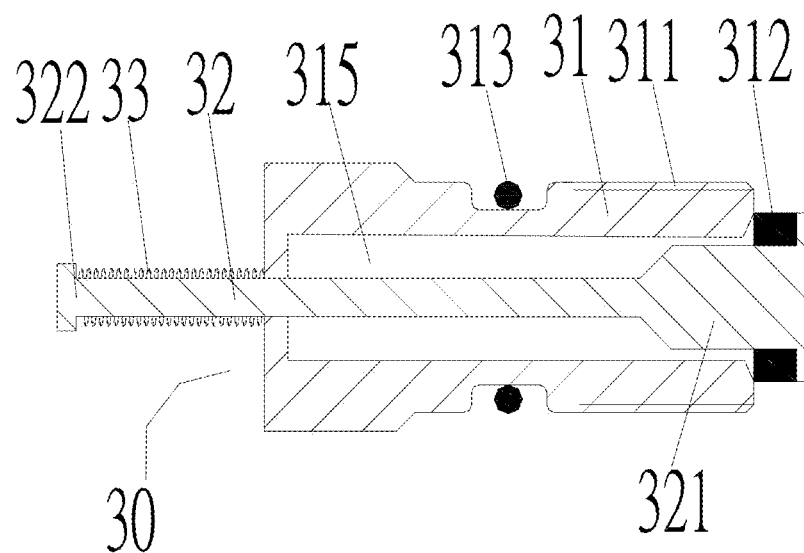
FIG. 7 schematically shows a sectional view of a valve core assembly of the disclosure.

10. Outer valve body; 11. First inner cavity; 111. First internal thread; 12. Connection port; 13. Installing hole; 14. First prism section; 15. Stop structure; 20. Inner valve body; 21. Second inner cavity; 211. Second internal thread; 22. First external thread; 23. First sealing ring; 24. Second prism section; 25. Connection portion; 26. Groove; 27. Thread section; 30. Valve core assembly; 31. Valve core; 311. Second external thread; 312. Second sealing ring; 315. Charging channel; 32. Valve rod; 321. Blocking head; 322. Outer flange; 33. Elastic element; 40. Valve cover; 41. Thread hole; and 42. First sealing gasket.

DETAILED DESCRIPTION OF THE EMBODIMENTS

It should be noted that the embodiments in the disclosure and the features in the embodiments are combined with each other without conflict. The disclosure will be described in detail below with reference to the accompanying drawings and in conjunction with the embodiments.

It should be noted that terms used here are only used for describing specific implementation modes, and are not intended to limit the exemplary implementation modes according to the disclosure. As used herein, unless clearly specified otherwise in the context, a singular form is also intended to include a plural form. In addition, it should also be understood that when the terms "comprising" and/or "including" are used in the description, it is indicated that there are features, steps, operations, devices, components and/or combinations thereof.

It should be noted that the terms "first", "second", and the like in the specification and claims of the disclosure and in the above drawings are used to distinguish similar objects and are not necessarily used to describe a specific sequence or order. It will be appreciated that the data used in this way is interchanged where appropriate, so that the implementation manners of the disclosure described herein can be implemented, for example, in an order other than those illustrated or described herein. In addition, the terms "include" and "have" and any variations thereof are intended to cover non-exclusive inclusions. For example, a process, method, system, product, or equipment that comprises a series of steps or units need not be limited to those steps or units that are explicitly listed, and is instead include other steps or units that are not explicitly listed or inherent to these processes, methods, products or equipment.

For ease of description, spatially relative terms such as "on", "over", "on an upper surface", "above", etc. are used herein to describe a spatial position relationship between one device or feature as shown in the figures and other devices or features. It will be appreciated that the spatially relative terms are intended to comprise different orientations of the device in use or operation in addition to the orientation of the device described in the figures. For example, if the device in the figures is turned upside down, the device described as "over other devices or configurations" or "on other devices or configurations" will be positioned "below other devices or configurations" or "under other devices or configurations". Thus, the exemplary term "over" include both "above" and "below". The device may also be positioned in other different manners (rotated for 90 degrees or at other orientations), and the spatially relative descriptors used herein are interpreted accordingly.

Reference to FIG. 1 to FIG. 7, according to some embodiments of the disclosure, a charging valve is provided, and the charging valve in the some embodiments includes an outer valve body 10, an inner valve body 20 and a valve core assembly 30.

Herein, the outer valve body 10 includes a first inner cavity 11, the outer valve body 10 is provided with a connection port 12 in communication with the first inner cavity 11; the inner valve body 20 is movably installed in the first inner cavity 11, and the inner valve body 20 has a sealing position for closing the connection port 12 and a charging position for opening the connection port 12, similarly, the inner valve body 20 in the some embodiments is provided with a second inner cavity 21; during installing, the valve core assembly 30 is installed in the second inner cavity 21, the valve core assembly 30 includes a valve core 31 and a valve rod mechanism, the valve core 31 is installed in the second inner cavity 21, the valve core 31 is provided with a charging channel 315, the valve rod mechanism is installed in the charging channel 315 so as to open or close the charging channel 315, when the inner valve body 20 is positioned in the charging position, and the charging channel 315 is opened by the valve rod mechanism, the charging channel 315 is communicated with the connection port 12, a refrigerant is conveniently charged into an air conditioning system connected with the connection port 12 or the air conditioning system is vacuumized.

It is known in combination with the above structure that because the valve body of the charging valve in the disclosure includes the outer valve body 10 and the inner valve body 20, the inner valve body 20 is a structure which is moveably installed in the first inner cavity 11 in the outer valve body 10, in actual use, the inner valve body 20 has the sealing position for closing the connection port 12 on the outer valve body 10 and the charging position for opening the connection port 12. When the charging valve in the disclosure is used in the air conditioning system, through the effect of the inner valve body 20, the isolation of the valve core assembly 30 and the connection port 12 is achieved, when the air conditioning system is vacuumized, an unused charging valve does not cause former incomplete vacuumization due to an insufficient spring force on the valve core assembly; and at the same time, through a cut-off function that the connection port 12 is closed by the inner valve body 20, a problem that air enters the air conditioning system in a vacuum state or that leakage appears in the valve core assembly 30 is avoided.

At least two sealing structures are configured in a gap between the inner valve body 20 and the outer valve body 10 in the some embodiments, airtightness and pressure resistance of the charging valve in the some embodiments are effectively enhanced.

In order to conveniently install, a first end face of the outer valve body 10 in the some embodiments is provided with an installing hole 13 in communication with the first inner cavity 11, a side wall of a second end, away from a first end, of the outer valve body 10 is provided with the connection port 12, the inner valve body 20 is installed in the first inner cavity 11 from the installing hole 13 and reciprocated along a direction from the first end of the outer valve body 10 to the second end so as to switch between the sealing position and the charging position.

Figure 8:
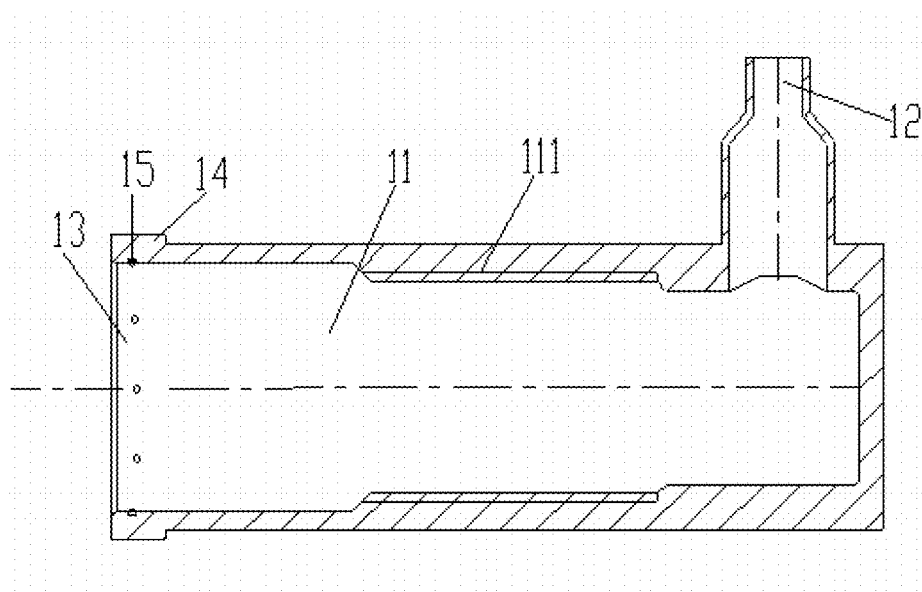
FIG. 8 schematically shows a sectional view of an inner valve body of another embodiment of the disclosure.

An inner wall of the installing hole 13 in the some embodiments is provided with a stop structure 15, the inner valve body 20 is prevented from moving too much so that a refrigerant is leaked during charging. In some embodiments, the stop structure 15 in the some embodiments is a stop ring (shown on FIG. 5), certainly, in other embodiments of the disclosure, the stop structure 15 is also configured as multiple stop bulges (shown on FIG. 8) configured along the same circumferential direction of the installing hole 13, only if other variation modes are under a concept of the disclosure, they all fall within a scope of protection of the disclosure.

In an actual machining process, firstly the inner wall of the installing hole 13 is machined with a ring-shaped groove, and the stop ring with certain elasticity and hardness is installed in the ring-shaped groove, correspondingly, a ring-shaped outer lug boss of which an outer diameter is greater than an inner diameter of the stop ring is configured on the inner valve body 20, during installing, the ring-shaped outer lug boss is extruded to enter the installing hole 13 and installed in the first inner cavity 11, the structure is simple, and the installation is convenient.

Reference to FIG. 1, FIG. 2, FIG. 4 and FIG. 5, an inner wall of the first inner cavity 11 in the some embodiments is provided with a first internal thread 111, the first internal thread 111 is positioned between the installing hole 13 and the connection port 12; a periphery of the inner valve body 20 is provided with a first external thread 22, the outer valve body 10 and the inner valve body 20 are cooperatively connected through the first internal thread 111 and the first external thread 22, on the one hand, the inner valve body 20 is conveniently moved in the first inner cavity 11 so as to switch between the sealing position and the charging position, and on the other hand, first sealing is also conveniently performed on the gap between the outer valve body 10 and the inner valve body 20.

In some embodiments, each of two ends of the first external thread 22 in the some embodiments is provided with at least one first sealing ring 23, second sealing and third sealing is conveniently performed on the gap between the inner valve body 20 and the outer valve body 10, the airtightness and pressure resistance of the charging valve are increased.

One end of the outer valve body 10 in the some embodiments is provided with a first prism section 14, the first prism section 14 provides an origin of force of a spanner while the inner valve body 20 is screwed into the outer valve body 10, a tangential force to a pipeline is prevented when the inner valve body 20 is screwed, so that the pipeline is deformed.

Similarly, a first end, close to the installing hole 13, of the inner valve body 20 is provided with a second prism section 24, the second prism section 24 provides the origin of force of the spanner while the inner valve body 20 is screwed into the outer valve body 10, insufficient rotation is prevented, so that the refrigerant is leaked.

The first prism section 14 and the second prism section 24 in the disclosure are configured as structures such as a regular hexagonal prism or a regular quadrangular prism or a regular pentagonal prism or a regular triangular prism, only if other variation modes are under a concept of the disclosure, they all fall within a scope of protection of the disclosure.

In order to conveniently connect with a charging machine, the periphery of the inner valve body 20 in the some embodiments is provided with a connection portion 25, the connection portion 25 is farther away from the connection port 12 than the second prism section 24.

In some embodiments, the connection portion 25 in the some embodiments is a lug boss, and there is a groove 26 between the lug boss and the second prism section 24, during installing, a connection end head of the charging machine hooks the lug boss and is locked in the groove 26, not only the charging valve in the some embodiments is conveniently connected with the charging machine, but also connection airtightness between the charging machine and the charging valve is conveniently guaranteed.

Reference to FIG. 1 to FIG. 7 again, the second inner cavity 21 in the some embodiments passes through the inner valve body 20 along a length direction of the inner valve body 20, and a first end of the inner valve body 20 is detachably provided with a valve cover 40, the valve cover 40 is capable of achieving sealing of the inner valve body 20 and cutting off relationship between the inner valve body 20 and the outside, impurities such as dust are prevented from entering the inner valve body 20 so as to pollute the valve core assembly 30, so that the valve core assembly 30 is effectively sealed and the leakage is produced.

In order to improve a sealing property of the valve cover 40 in the some embodiments, the first end of the inner valve body 20 in the some embodiments is provided with a thread section 27, the valve cover 40 is provided with a thread hole 41 cooperatively connected with the thread section 27, and a bottom of the thread hole 41 is provided with a first sealing gasket 42, through thread connection and the effect of the first sealing gasket 42, not only the valve cover 40 is installed at the first end of the inner valve body 20, but also double sealing is achieved.

An exterior of the valve core 31 is provided with a second external thread 311, a second internal thread 211 is configured in the second inner cavity 21, the valve core 31 and the inner valve body 20 are cooperatively connected through the second external thread 311 and the second internal thread 211, through cooperative effect of the second internal thread 211 and the second external thread 311, the valve core 31 is conveniently installed in the second inner cavity 21, and a gap between the valve core 31 and the second inner cavity 21 are also sealed, the refrigerant is prevented from leaking.

In some embodiments, a second sealing ring 313 is configured between the valve core 31 and the second inner cavity 21 in the some embodiments, and the second sealing ring 313 is positioned at a first end or a second end of the second external thread 311; or two second sealing rings are respectively positioned at the first end and the second end of the second external thread. The gap between the valve core 31 and the second inner cavity 21 is conveniently sealed again.

In order to charge the refrigerant into the air conditioning system, the charging channel 315 in the some embodiments passes through the valve core 31 along a length direction of the inner valve body 20, the valve rod mechanism includes a valve rod 32 and an elastic element 33, during installing, the valve rod 32 is installed in the charging channel 315, a first end of the valve rod 32 is protruded from the valve core 31, and a first end of the valve rod 32 is provided with an outer flange 322, the elastic element 33 is sheathed on the valve rod 32, and two ends of the elastic element 33 are respectively pressed against the outer flange 322 and the valve core 31, a second end of the valve rod 32 is provided with a blocking head 321 and a second sealing gasket 312, when a pressing force is applied to the first end of the valve rod 32 in a direction from the first end to the second end, the blocking head 321 is moved towards a direction away from the charging channel 315, and the charging channel 315 is opened by the blocking head 321; and when an external force is not applied to the valve rod 32, the blocking head 321 is pressed close to the valve core 31 under the effect of the elastic element 33, a gap between the charging channel 315 and the blocking head 321 is sealed by the second sealing gasket 312, and the charging channel 315 is closed.

When it is necessary to charge the air conditioning system with the refrigerant, the connection port 12 is connected with a refrigerant pipeline of the air conditioning system, the valve cover 40 is opened, and then the connection port 12 is opened by the inner valve body 20 and positioned in the charging position, the charging channel 315 is opened by using a valve needle of the charging machine to push the valve rod mechanism, and then the refrigerant is fed into the charging channel 315, the refrigerant enters the first inner cavity 11 from the charging channel 315, and then enters the air conditioning system from the connection port 12. A specific process of charging the refrigerant is as follows: ① the valve cover 40 is unscrewed; ② the inner valve body 20 is unscrewed out of the outer valve body 10 by using a spanner so as to open the connection port 12, until the inner valve body 20 is unscrewed to the stop ring of the outer valve body 10; ③ a port of the charging machine is connected to the inner valve body 20, at this moment the port of the charging machine pushes the valve rod 32 away; ④ the refrigerant is charged; ⑤ the charging machine is removed after charging is completed, at this moment the valve rod 32 is automatically reset under the effect of the elastic element 33, and the charging channel 315 is located in a closing state; ⑥ the inner valve body is screwed into the outer valve body 10 by using the spanner; and ⑦ the valve cover 40 is closed, and the whole charging process is ended.

When it is necessary to vacuumize the air conditioning system, an operating process is the same as the process of charging the refrigerant.

It is known from the above embodiments that the inner valve body 20 and the outer valve body 10 in the disclosure are sealed through the two first sealing rings 23 on the inner valve body 20, and fixed together through the first external thread 22 on the inner valve body 20 and the first internal thread 111 on the outer valve body 10, when the charging valve of the disclosure is used in the air conditioning system, the refrigerant in the air conditioning system is isolated in the system by the inner valve body 20, and can not enter the second inner cavity 21 of the inner valve body 20; the valve core assembly 30 and the inner valve body 20 are sealed through the second sealing ring 313, and fixed together through the second external thread 311 and the second internal thread 211 on the valve core 31, the valve rod 32 and the valve core 31 are sealed by the second sealing gasket 312, and the air is isolated from entering the inner valve body 20; and the valve cover 40 and the inner valve body are fixed together, the impurities such as dust is prevented from entering the valve.

According to another aspect of the disclosure, an air conditioning system is provided, and the air conditioning system includes the charging valve in the above embodiments.

According to another aspect of the disclosure, an electric vehicle is provided, and the electric vehicle includes the air conditioning system in the above embodiments.

It is observed from the above description that the above embodiments of the disclosure achieve the following technical effects.

The valve body of the charging valve of the disclosure includes the outer valve body and the inner valve body, a valve body cavity and the air conditioning system are sealed by using the sealing ring, and the airtightness and the pressure resistance of the system are increased by using a valve core sheath structure double-sealed by the sealing ring and the thread, after the charging of the refrigerant is completed, the valve core sheath is screwed, so a sealing function is achieved; and according to the charging valve of the disclosure, the valve core assembly is placed in the inner valve body, the isolation between the valve core and the air conditioning system is achieved, when the system is vacuumized, the unused charging valve does not cause the incomplete vacuumization due to the insufficient spring force because the valve core sheath structure is configured and the valve core and the system are isolated, through the cut-off function of the charging valve, the air is prevented from entering the air conditioning system in the vacuum state of the system.

The foregoing descriptions are merely embodiments of the disclosure and are not intended to limit the disclosure. For those skilled in the art, the disclosure has various changes and modifications. Any modifications, equivalent replacements and improvements made within the spirit and principle of the disclosure shall fall within the protection scope of the disclosure.

What is claimed is:

1. A charging valve, comprising:
   an outer valve body, the outer valve body comprises a first inner cavity, the outer valve body is provided with a connection port in communication with the first inner cavity;
   an inner valve body, the inner valve body is movably installed in the first inner cavity, the inner valve body has a sealing position for closing the connection port and a charging position for opening the connection port, and the inner valve body is provided with a second inner cavity; and
   a valve core assembly, the valve core assembly is installed in the second inner cavity, at least two sealing structures are configured in a gap between the inner valve body and the outer valve body, a first end face of the outer valve body is provided with an installing hole in communication with the first inner cavity, a side wall of a second end, opposite to a first end, of the outer valve body is provided with the connection port, the inner valve body is installed in the first inner cavity from the installing hole and reciprocated along a direction from the first end of the outer valve body to the second end so as to switch between the sealing position and the charging position, an inner wall of the first inner cavity is provided with a first internal thread, the first internal thread is positioned between the installing hole and the connection port; and
   a periphery of the inner valve body is provided with a first external thread, the outer valve body and the inner valve body are cooperatively connected through the first internal thread and the first external thread to achieve a first sealing of the at least two sealing structures, each of two ends of the first external thread is provided with at least one first sealing ring to achieve a second sealing and a third sealing of the at least two sealing structures.

2. The charging valve as claimed in claim 1, wherein an inner wall of the installing hole is provided with a stop structure.

3. The charging valve as claimed in claim 2, wherein the stop structure is a stop ring or multiple stop bulges configured along the same circumferential direction of the installing hole.

4. The charging valve as claimed in claim 1, wherein one end of the outer valve body is provided with a first prism section.

5. The charging valve as claimed in claim 1, wherein a first end, close to the installing hole, of the inner valve body is provided with a second prism section.

6. The charging valve as claimed in claim 5, wherein a periphery of the inner valve body is provided with a connection portion, the connection portion is farther away from the connection port than the second prism section.

7. The charging valve as claimed in claim 6, wherein the connection portion is a lug boss, and there is a groove between the lug boss and the second prism section.

8. The charging valve as claimed in claim 1, wherein the second inner cavity passes through the inner valve body along a length direction of the inner valve body, and a first end of the inner valve body is detachably provided with a valve cover.

9. The charging valve as claimed in claim 8, wherein the first end of the inner valve body is provided with a thread section, the valve cover is provided with a thread hole cooperatively connected with the thread section, and a bottom of the thread hole is provided with a first sealing gasket.

10. The charging valve as claimed in claim 1, wherein the valve core assembly comprises a valve core and a valve rod mechanism, the valve core is installed in the second inner cavity, the valve core is provided with a charging channel, the valve rod mechanism is installed in the charging channel so as to open or close the charging channel, when the inner valve body is positioned in the charging position and the charging channel is opened by the valve rod mechanism, the charging channel is communicated with the connection port.

11. The charging valve as claimed in claim 10, wherein an exterior of the valve core is provided with a second external thread, a second internal thread is configured in the second inner cavity, the valve core and the inner valve body are cooperatively connected through the second external thread and the second internal thread.

12. The charging valve as claimed in claim 11, wherein a second sealing ring is configured between the valve core and the second inner cavity, and the second sealing ring is positioned at a first end or a second end of the second external thread; or two second sealing rings are respectively positioned at the first end and the second end of the second external thread.

13. The charging valve as claimed in claim 10, wherein the charging channel passes through the valve core along a length direction of the inner valve body, the valve rod mechanism comprises:
   a valve rod and an elastic element, the valve rod is installed in the charging channel, a first end of the valve rod is protruded from the valve core, and a first end of the valve rod is provided with an outer flange, the elastic element is sheathed on the valve rod, and two ends of the elastic element are respectively pressed against the outer flange and the valve core; and
   a second end of the valve rod is provided with a blocking head and a second sealing gasket, when a pressing force is applied to the first end of the valve rod in a direction from the first end to the second end, the blocking head is moved towards a direction away from the charging channel, and the charging channel is opened by the blocking head; and when an external force is not applied to the valve rod, the blocking head is pressed close to the valve core under the effect of the elastic element, a gap between the charging channel and the blocking head is sealed by the second sealing gasket, and the charging channel is closed.

14. An air conditioning system, comprising a charging valve, wherein the charging valve is the charging valve as claimed in claim 1.

15. An electric vehicle, comprising an air conditioning system, wherein the air conditioning system is the air conditioning system as claimed in claim 14.

16. The air conditioning system as claimed in claim 14, wherein at least two sealing structures are configured in a gap between the inner valve body and the outer valve body.

* * * * *